United States Patent
Lemberg (10) Patent No.: US 8,019,367 B2
(45) Date of Patent: Sep. 13, 2011

(54) MOBILE TERMINATED SHORT MESSAGE SERVICE BLOCKING

(75) Inventor: Vyacheslav Lemberg, Long Grove, IL (US)

(73) Assignee: Freescale Semiconductor, Inc., Austin, TX (US)

( * ) Notice: Subject to any disclaimer, the term of this patent is extended or adjusted under 35 U.S.C. 154(b) by 417 days.

(21) Appl. No.: 12/246,965

(22) Filed: Oct. 7, 2008

(65) Prior Publication Data

US 2010/0087213 A1    Apr. 8, 2010

(51) Int. Cl.
*H04W 4/00* (2009.01)

(52) U.S. Cl. .................. 455/466; 455/412.2

(58) Field of Classification Search .......... None
See application file for complete search history.

(56) References Cited

U.S. PATENT DOCUMENTS

| | | | |
|---|---|---|---|
| 6,101,393 A | | 8/2000 | Alperovich et al. |
| 7,139,259 B2* | | 11/2006 | Qu et al. .......... 370/342 |
| 2005/0020289 A1* | | 1/2005 | Kim et al. .......... 455/466 |
| 2005/0113119 A1* | | 5/2005 | Tu et al. .......... 455/466 |
| 2006/0270391 A1* | | 11/2006 | Kim et al. .......... 455/414.1 |
| 2007/0197212 A1 | | 8/2007 | Marsico et al. |
| 2009/0209234 A1* | | 8/2009 | Bright et al. .......... 455/412.2 |

* cited by examiner

*Primary Examiner* — Erika Gary
(74) *Attorney, Agent, or Firm* — Lempia Summerfield Katz LLC (57) ABSTRACT

A method and system allow a mobile subscriber to block reception of mobile terminated (MT) Short Message System (SMS) messages yet still have the ability to send outgoing mobile originated SMS messages. The method and system include determining whether a MT SMS feature setting is enabled or disabled at an SMS layer of a protocol stack of the mobile device and transmitting a mobile device registration message to a mobile network service center as SMS capable or incapable, depending on the MT SMS feature setting. The mobile device may be registered as SMS incapable by setting certain fields within information elements of registration messages. If a MT SMS message is received and the MT SMS feature setting is disabled, then the SMS layer may increment a blocked message counter and transmit a failure message to the service center. The service center may be included in a base station of the mobile network.

22 Claims, 5 Drawing Sheets

MOBILE TERMINATED SHORT MESSAGE SERVICE BLOCKING

BACKGROUND

1. Field

The present embodiments relate generally to Short Message Service (SMS) messages, and more specifically, to blocking mobile terminated SMS messages.

2. Related Art

The Short Message System (SMS) communication protocol allows text messages to be sent and received by mobile devices through a mobile network. Communications standards defined by the 3rd Generation Partnership Project (3GPP), including Global System for Mobile Communications (GSM), General Packet Radio Service (GPRS), and Universal Mobile Telecommunication System (UMTS), support the SMS protocol. A mobile device can receive SMS messages through the mobile network from other mobile devices, computers, or other gateways. However, a mobile subscriber may wish to control the receipt of incoming SMS messages, also known as mobile terminated (MT) SMS messages. For example, a mobile subscriber may not want to receive unsolicited incoming SMS messages on their mobile device, particularly if there is a fee for receiving SMS messages. In other cases, parents may wish to control the mobile devices of their children to block incoming SMS messages.

To block MT SMS messages, a mobile subscriber can contact their service provider and request cancellation of the SMS feature on their account. The service provider configures elements in the mobile network to reject SMS messages intended for the particular mobile device of the mobile subscriber. However, cancelling the SMS feature may also prevent the mobile subscriber from sending outgoing SMS messages (mobile originated SMS) from their mobile device. In addition, it is inefficient and time-consuming for the mobile subscriber to contact their service provider each time the mobile subscriber wants to cancel or activate the SMS feature.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

By way of introduction, the embodiments described below include a method and system for blocking a mobile terminated (MT) Short Message System (SMS) message to a mobile device. These embodiments allow a mobile subscriber to block MT SMS messages by setting a MT SMS feature setting on the mobile device. The MT SMS feature setting is determined to be enabled or disabled. The MT SMS feature setting may be enabled or disabled at an SMS layer of a protocol stack of the mobile device. If the MT SMS feature setting is enabled, the mobile device is registered as SMS capable with a base station. If the MT SMS feature setting is disabled, the mobile device is registered as SMS incapable with the base station. The SMS layer may include a Short Message-Transfer Layer. If a MT SMS message is received at the SMS layer from the base station and the MT SMS feature setting is disabled, a blocked message counter may be incremented and a failure message may be transmitted to the base station. The base station may include a service center.

Figure 1:
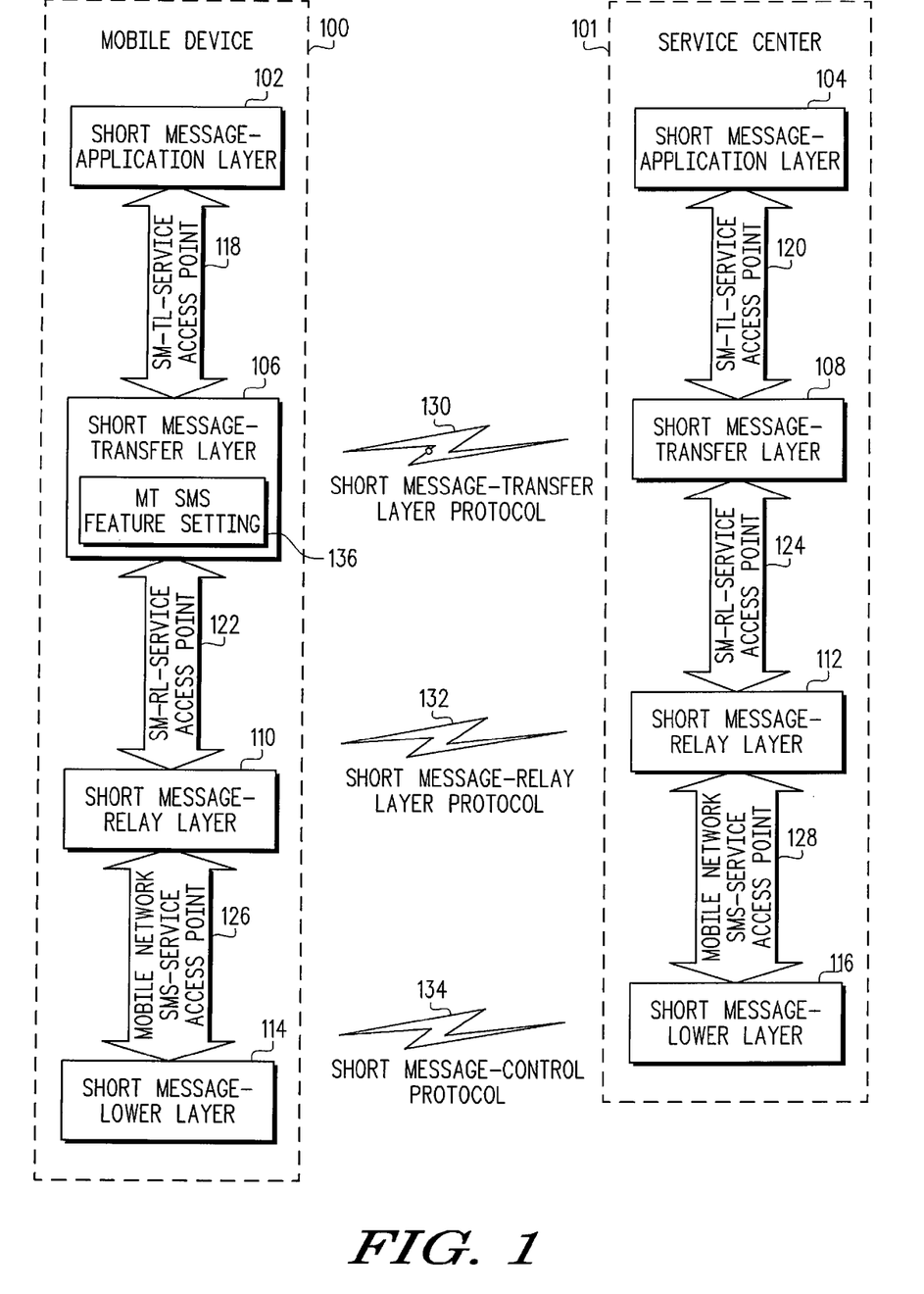
FIG. 1 is a diagram of layers of protocol stacks for the Short Message Service (SMS) communication protocol.

FIG. 1 is a diagram of layers of protocol stacks 100 and 101 for the Short Message Service communication protocol. The mobile device protocol stack 100 and the service center protocol stack 101 on a mobile network implement SMS capabilities and features. The service center is an element on the mobile network, and may be included in a base station in wireless communication with the mobile device. The layers included in the protocol stacks 100 and 101 implement particular functions of the SMS protocol. When a mobile terminated (MT) SMS message is received, each layer extracts information from headers of the SMS message and processes the information to manage delivery of the MT SMS message.

Within the mobile device protocol stack 100 or the service center protocol stack 101, each layer provides services to upper layers of the protocol stack over an interface known as a service access point. In addition, between the mobile device protocol stack 100 and the service center protocol stack 101, most of the layers communicate with their respective peer layer using a layer-specific protocol. These communications may be an "over-the-air" connection between the mobile device and the service center.

The layers in the protocol stacks 100 and 101 each respectively include a Short Message-Application Layer (SM-AL) 102 and 104, a Short Message-Transfer Layer (SM-TL) 106 and 108, a Short Message-Relay Layer (SM-RL) 110 and 112, and a Short Message-Lower Layer (SM-LL) 114 and 116. The layers and their interactions are defined by Technical Specifications 23.040 and 24.011 of the 3rd Generation Partnership Project (3GPP) standard. The 3GPP standard may include the Global System for Mobile Communications (GSM), General Packet Radio Service (GPRS), and/or Universal Mobile Telecommunication System (UMTS). Other layers, interactions, and/or standards may be used for MT SMS messaging.

Each layer implements particular functions of the SMS protocol. For example, the SM-LL 114 and 116 may make sure that data in the MT SMS message is transmitted properly at the physical level. The SM-RL 110 and 112 may ensure data within the MT SMS message is routed to the correct destination. The SM-TL 106 and 108 may interpret and verify that header fields within the MT SMS message are in the correct format. The highest layers, SM-AL 102 and 104, may communicate with software applications in the mobile device and the service center, respectively, to send, receive, interpret, and/or display the content of the MT SMS message.

Within each protocol stack 100 and 101, communication between the SM-AL 102 and 104 and the SM-TL 106 and 108 is over the respective SM-TL-Service Access Point (SAP) 118 and 120. Similarly, communication between the SM-TL 106 and 108 and the SM-RL 110 and 112 is over the respective SM-RL-SAP 122 and 124. Finally, communication between the SM-RL 110 and 112 and SM-LL 114 and 116 is over the respective Mobile Network Service-SAP 126 and 128. Communication between layers within a protocol stack may include messages related to services provided to an upper layer by a lower layer.

Between each protocol stack 100 and 101, communication between the SM-TL 106 and 108 uses the Short Message-TL Protocol 130, between the SM-RL 110 and 112 uses the Short Message-RL Protocol 132, and between the SM-LL 114 and 116 uses the Short Message-Control Protocol 134. Messages between the peer layers of the protocol stacks 100 and 101 may include data, status messages, acknowledgments, or other messages used to manage delivery of the MT SMS message.

When a MT SMS message is sent to the mobile device, an application in communication with the SM-AL 104 in the service center may configure a Transfer Protocol Data Unit (TPDU) at the SM-TL 108 with the message content and a header containing routing and other information. The TPDU is transferred from the SM-TL 108 of the service center to the SM-TL 106 of the mobile device. The SM-RL 112 and SM-LL 116 also extract information from the header of the MT SMS message to perform functions specific to their layers. The SM-RL 112 and SM-LL 116 communicate with their peer layers 110 and 114 to manage delivery of the MT SMS message.

In one embodiment of a system for blocking mobile terminated SMS messages to a mobile device, the SM-TL 106 on the mobile device is modified to support a MT SMS feature setting 136. Configuration of the MT SMS feature setting 136 on the mobile device indicates whether MT SMS messages should be blocked. When the MT SMS feature setting 136 is enabled, the mobile device may be registered as MT SMS capable with a service center. Conversely, when the MT SMS feature setting 136 is disabled, the mobile device may be registered as MT SMS incapable with the service center. The SM-TL 106 may check the MT SMS feature setting 136 to determine whether to block MT SMS messages but still allow sending of outgoing mobile originated SMS messages.

The service center may still attempt to send a MT SMS message to the mobile device even if the mobile device has been previously registered as MT SMS incapable. The mobile device may have registered as MT SMS incapable if the MT SMS feature setting 136 was disabled as described above, for example. The service center may attempt to send a MT SMS message if the service center is unaware that the mobile device is supposed to be MT SMS incapable, if the service center software is malfunctioning, or for other reasons. If a MT SMS message is still sent, the SM-TL 106 may check the MT SMS feature setting 136 to determine its state. If the MT SMS feature setting 136 is disabled, then a blocked message counter may be incremented and a failure message transmitted to the service center.

Figure 2:
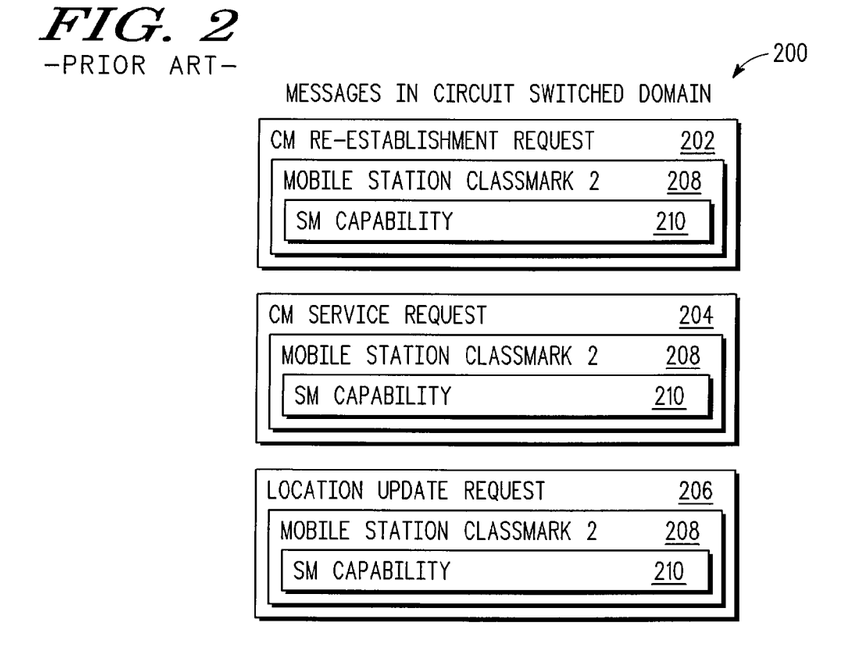
FIG. 2 is a diagram of prior art mobile device registration messages in the circuit switched domain.

FIG. 2 is a diagram of prior art mobile device registration messages 200 in the circuit switched domain. The registration messages 200 may be transmitted by a mobile device when registering with the mobile network for service. In the circuit switched domain, the registration messages indicate that the mobile device is registering with the mobile network to establish a fixed bandwidth circuit for voice and data access. The mobile device may also simultaneously register with the mobile network in the packet switched domain, described below with respect to FIG. 3. The messages are also known as Layer 3 messages and are defined by Technical Specification 24.008 of the 3rd Generation Partnership Project (3GPP) standard.

A field within an information element of the registration messages 200 may be set to indicate to the mobile network whether MT SMS messages are supported by the mobile device. The mobile network uses the registration information it receives from the mobile device to determine whether or not to forward MT SMS messages to the mobile device. If the mobile device registration indicates support for MT SMS messages, the MT SMS message will be transmitted from the mobile network to the mobile device. However, if the mobile device registration indicates that MT SMS messages are not supported, the mobile network will reject the MT SMS message.

The mobile device registration messages 200 include a Connection Management (CM) Re-Establishment Request message 202, a CM Service Request message 204, and a Location Update Request message 206. Each of the messages 202, 204, and 206 may be sent to register the mobile device with the mobile network and include an information element (Mobile Station Classmark 2 208) with a field (Short Message (SM) Capability 210) that indicates whether MT SMS messages are supported. If the MT SMS feature setting 136 is enabled, the SM Capability field 210 is set to 1 and the mobile network is informed that the mobile device supports MT SMS messages. Conversely, if the MT SMS feature setting 136 is disabled, the SM Capability field 210 is set to 0 and the mobile network is informed that the mobile device does not support MT SMS messages.

Depending on the connection status of the mobile device to the mobile network, one or more of the registration messages 200 may be sent when registering the mobile device with the mobile network. The CM Re-Establishment Request message 202 is sent by the mobile device to the mobile network to request re-establishment of a connection if the previous connection has failed. The CM Service Request message 204 is sent by the mobile device to the mobile network to request services for the mobile device, including MT SMS messages. The Location Update Request message 206 is sent to the mobile network by the mobile device either to request an update of its location file in the mobile network or to request an International Mobile Subscriber Identity (IMSI) attachment procedure.

Figure 3:
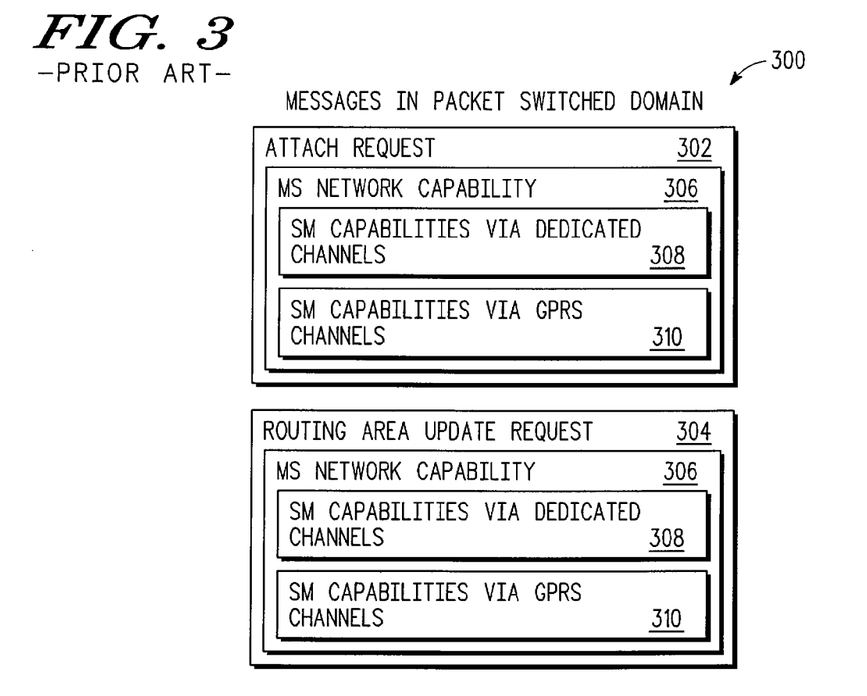
FIG. 3 is a diagram of prior art mobile device registration messages in the packet switched domain.

FIG. 3 is a diagram of prior art mobile device registration messages 300 in the packet switched domain. The registration messages 300 may be transmitted by a mobile device when registering with the mobile network for service. In the packet switched domain, the registration messages indicate that the mobile device is registering with the mobile network to establish a connection for routing packets for voice and data access. The mobile device may also simultaneously register with the mobile network in the circuit switched domain, described above with respect to FIG. 2. The messages are also known as Layer 3 messages and are defined by Technical Specification 24.008 of the 3rd Generation Partnership Project (3GPP) standard. Similar to the mobile device registration messages 200 in the circuit switched domain, a field within an information element of the registration messages 300 may be set to indicate to the mobile network whether MT SMS messages are supported by the mobile device. The mobile network uses the registration information it receives from the mobile device to determine whether or not to forward MT SMS messages to the mobile device.

The mobile device registration messages 300 include an Attach Request message 302 and a Routing Area Update Request message 304. Each of the messages 302 and 304 may be sent to register the mobile device with the mobile network and include an information element (Mobile Station (MS) Network Capability 306) with fields (Short Message (SM) Capabilities via Dedicated Channels 308 and SM Capabilities via GPRS Channels 310) that indicate whether MT SMS messages are supported. If the MT SMS feature setting 136 is enabled, the fields 308 and 310 are set to 1 and the mobile network is informed that the mobile device supports MT SMS messages. Conversely, if the MT SMS feature setting 136 is disabled, the fields 308 and 310 are set to 0 and the mobile network is informed that the mobile device does not support MT SMS messages.

Depending on the connection status of the mobile device to the mobile network, one or both of the registration messages 300 may be sent when registering the mobile device with the mobile network. The Attach Request message 302 is sent to the mobile network by the mobile device to perform a GPRS attachment procedure. The Routing Area Update Request message 304 is sent by the mobile device to the mobile network either to request an update of its location file in the mobile network or to request an IMSI attachment procedure.

Figure 4:
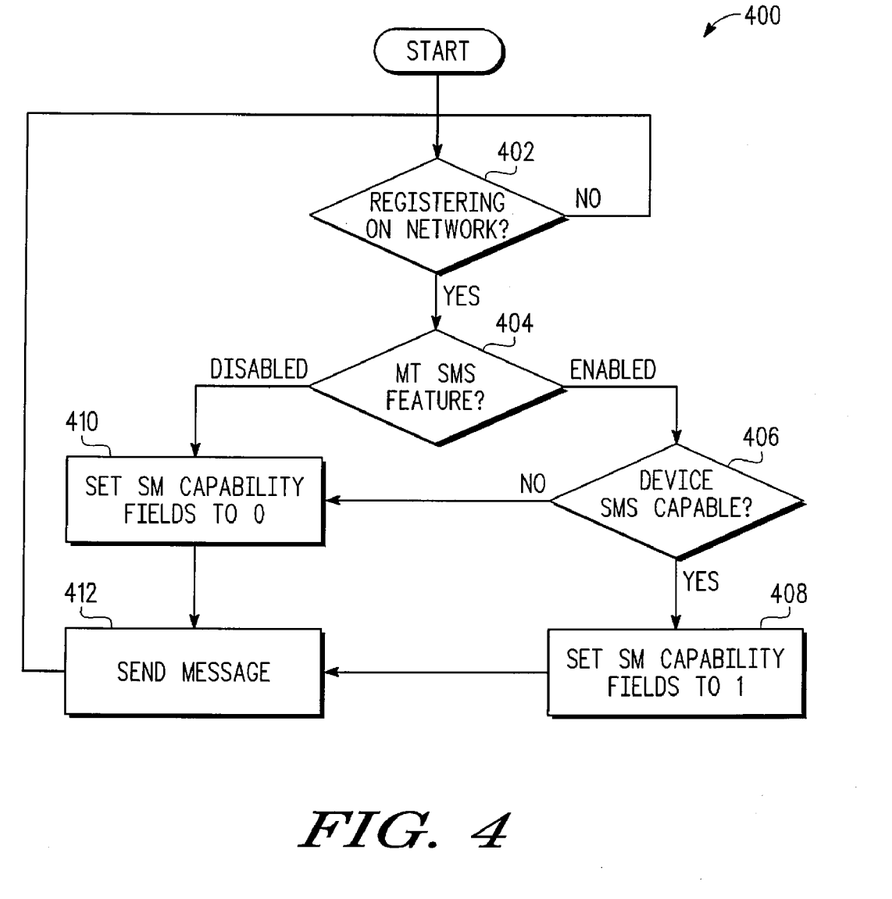
FIG. 4 is a flowchart of an embodiment of a method for blocking mobile terminated (MT) SMS messages.

FIG. 4 is a flowchart of an embodiment of a method 400 for blocking mobile terminated SMS messages to a mobile device. The method 400 allows configuration of a MT SMS feature setting 136 on the mobile device to indicate whether MT SMS messages should be blocked. When the MT SMS feature setting 136 is enabled, the mobile device may be registered as MT SMS capable with a service center, assuming the mobile device actually supports SMS. Conversely, when the MT SMS feature setting 136 is disabled, the mobile device may be registered as MT SMS incapable with the service center. The MT SMS feature setting 136 may be used by an SMS layer of the protocol stack of the mobile device, such as the Short Message-Transfer Layer (SM-TL) 106, to block MT SMS messages but still allow sending of outgoing mobile originated SMS messages. The service center may be included in a base station of the mobile network.

At Act 402, it is determined whether the mobile device is registering on the mobile network. The mobile device may register on the mobile network upon initial startup, reconnection to the network following a loss of connection, or during handoffs between base stations within the network, for example. If the mobile device is not registering on the mobile network, then no further acts are performed and the method 400 returns to Act 402 to continue checking whether registration is occurring. If the mobile device is registering on the mobile network, the method 400 continues to Act 404.

The MT SMS feature setting 136 is checked at Act 404 to determine whether it is enabled or disabled. The MT SMS feature setting 136 may have been configured then received at the SM-TL 106. A mobile subscriber may manually configure the MT SMS feature setting 136 or the mobile device may automatically configure the MT SMS feature setting 136 according to a predetermined schedule, for example. If the MT SMS feature setting 136 is disabled at Act 404, then the SM Capability fields 210, 308, and/or 310 are set to 0 at Act 410 and the appropriate registration messages are sent at Act 412. On the other hand, if the MT SMS feature setting 136 is enabled at Act 404, it is determined whether the mobile device has SMS capabilities at Act 406. If the mobile device has SMS capabilities, then the SM Capability fields 210, 308, and/or 310 are set to 1 at Act 408 and the appropriate registration messages are sent to the service center at Act 412. Conversely, if the mobile device does not have SMS capabilities, then the SM Capability fields 210, 308, and/or 310 are set to 0 at Act 410 and the appropriate registration messages are sent at Act 412.

Regardless of the status of the MT SMS feature setting 136, the appropriate registration messages from messages 200 and 300 sent to the service center at Act 412 depend on the connection status of the mobile device to the mobile network. In the circuit switched domain, the SM Capability field 210 is set to 0 or 1 in the Mobile Station Classmark 2 information element 208 within the CM Re-Establishment Request message 202, the CM Service Request message 204, and/or the Location Update Request message 206. In the packet switched domain, the SM Capabilities via Dedicated Channels field 308 and the SM Capabilities via GPRS Channels field 310 are set to 0 or 1 in the MS Network Capability information element 306 within the Attach Request message 302 and/or the Routing Area Update Request message 304. Following sending of the registration messages at Act 412, the method 400 returns to Act 402 to again check whether registration is occurring.

Setting the fields 210, 308, and/or 310 to 0 disables MT SMS messages from being sent to the mobile device but still allows mobile originated outgoing SMS messages to be sent from the mobile device. The configuration of the MT SMS feature setting 136 in the SM-TL 106 of the mobile device allows a mobile subscriber to configure blocking of MT SMS messages as desired and does not require contacting the service provider to entirely disable SMS functionality on the account. Only the SM-TL 106 is modified to achieve this functionality. Elements in the mobile network need not be modified because the settings of the fields 210, 308, and/or 310 are defined by the 3GPP standard and are already understood by the mobile network.

Figure 5:
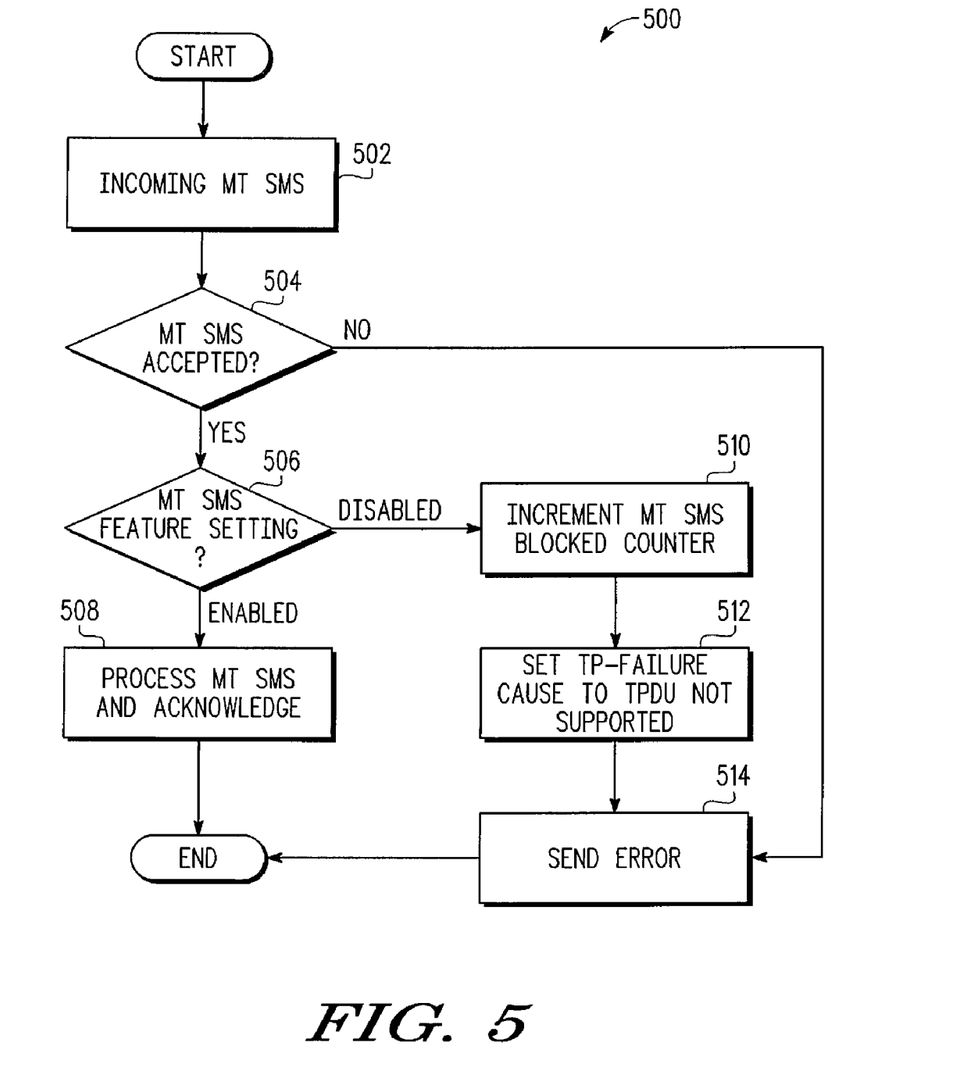
FIG. 5 is a flowchart of an alternative embodiment of a method for blocking MT SMS messages.

FIG. 5 is a flowchart of an alternative embodiment of a method for blocking MT SMS messages. A service center in the mobile network may still attempt to send a MT SMS message to a mobile device even if the mobile device has been previously registered as MT SMS incapable. The mobile device may have registered as MT SMS incapable if the MT SMS feature setting 136 was disabled as described with respect to FIG. 4, for example. The service center may attempt to send a MT SMS message if the service center is unaware that the mobile device is supposed to be MT SMS incapable, if the service center software is malfunctioning, or for other reasons. The method 500 increments a blocked message counter and transmits a failure message to the service center. A SMS layer, such as the Short Message-Transfer Layer (SM-TL) 106, may be configured to perform the method 500.

At Act 502, a MT SMS message is received by the SMS layer of the mobile device from the service center. In particular, the SM-TL 106 receives a SM-RL-DATA-Ind (Short Message-Relay Layer Data Indication) message with a SMS-DELIVER TPDU (Transfer Protocol Data Unit) from the SM-RL 110. The SM-RL-DATA-Ind message and SMS-DELIVER TPDU contain routing and payload information for the MT SMS message. At Act 504, it is determined whether the MT SMS message is accepted by the SM-TL 106 based on whether SM-RL-DATA-Ind message and SMS-DELIVER TPDU are in the proper format. For example, the routing and payload information in the SM-RL-DATA-Ind message and SMS-DELIVER TPDU need to conform to the proper format for successful routing and delivery of the MT SMS message.

If the SM-RL-DATA-Ind message and SMS-DELIVER TPDU are not in the proper format at Act 504, then the method 500 continues to Act 514. At Act 514, the service center is notified in an error message that delivery of the MT SMS message failed, and the method 500 is complete. The SM-TL 106 sends a SM-RL-REPORT-REQ (Short Message-Relay Layer Report Request) with a SMS-DELIVER-REPORT TPDU inside an RP-ERROR message. The SM-DELIVER-REPORT TPDU indicates to the service center that the MT SMS message delivery failed. A TP-FCS (Transfer Protocol-Failure Cause) information element within the SMS-DELIVER-REPORT TPDU is set to a hexadecimal value according to Technical Specification 23.040 of the 3GPP standard. For example, the TP-FCS information element may be set to indicate a specific reason for failure to transfer or process the MT SMS message such as due to an unsupported command, that a storage capacity is full, or other reasons.

However, if the SM-RL-DATA-Ind message and SMS-DELIVER TPDU are in the proper format at Act 504, then the method 500 continues to Act 506 to determine whether the MT SMS feature setting 136 is enabled or disabled. If the MT SMS feature setting 136 is enabled, meaning that MT SMS messages are not blocked, then the method 500 continues to Act 508. At Act 508, the MT SMS message is received, processed, and acknowledged, as specified by the 3GPP standard. For example, the payload information containing the text of the MT SMS message may be received and displayed on the mobile device. The mobile device may send a SM-RL-REPORT-REQ with a SMS-DELIVER-REPORT TPDU inside an RP-ACK (Relay Protocol Acknowledgment) message to the service center indicating successful receipt of the MT SMS message. In this case, the method 500 is complete after the acknowledgment is sent.

If the MT SMS feature setting 136 is disabled at Act 506, then a MT SMS blocked counter is incremented at Act 510. The MT SMS blocked counter indicates the number of MT SMS messages that have been sent from the service center but blocked. The MT SMS blocked counter may be reset by a user or automatically reset by the mobile device at predetermined times, for example. In addition to incrementing the MT SMS blocked counter, the mobile device may also save timestamps, sender information, or other information related to the blocked MT SMS messages.

After the MT SMS blocked counter has been incremented, an information element within the SMS-DELIVER-REPORT TPDU is set to indicate a specific failure cause to the service center at Act 512. The TP-FCS (Transfer Protocol-Failure Cause) information element is set to a hexadecimal value 0xB0 within the SMS-DELIVER-REPORT TPDU to indicate that TPDU is not supported. The mobile device sends a SM-RL-REPORT-REQ with an RP-ERROR message and the SMS-DELIVER-REPORT TPDU containing the 0xB0 TP-FCS information element to the service center at Act 514, and the method 500 is complete. This request indicates that the MT SMS message was not successfully delivered and also informs the service center of the specific failure cause, e.g., that MT SMS messages are being blocked by the mobile device.

Even if a MT SMS message is sent by the service center when previous registration indicated blocking of MT SMS messages, the mobile device may handle the MT SMS message by blocking it, incrementing a blocked message counter, and informing the service center that the MT SMS message was not successfully delivered. Mobile originated outgoing SMS messages may still be sent from the mobile device. Only the SM-TL 106 on the mobile device is modified to achieve this functionality and no elements on the mobile network are modified.

Figure 6:
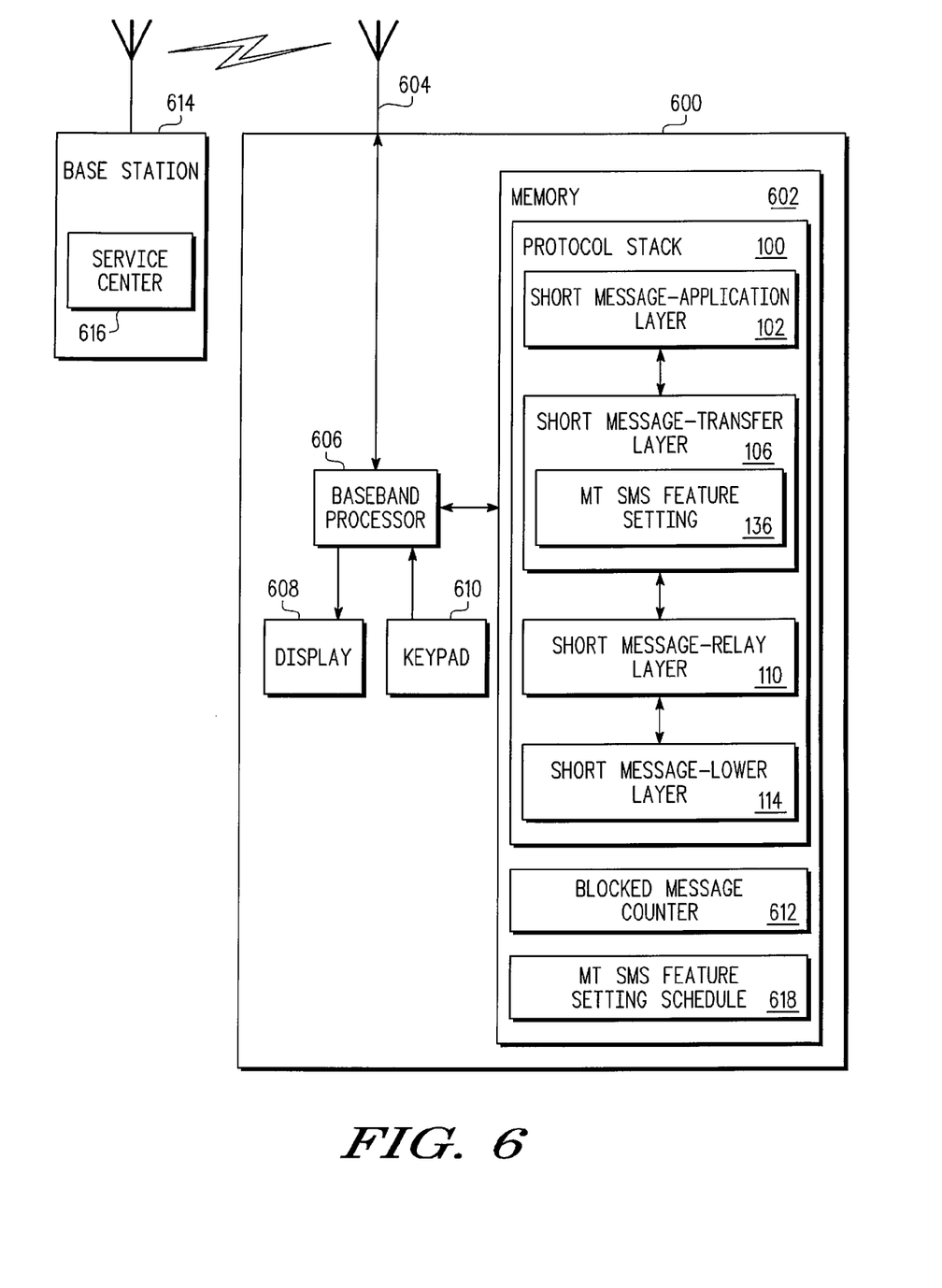
FIG. 6 is a block diagram of an exemplary mobile device including an embodiment of a system for blocking MT SMS messages.

FIG. 6 is a block diagram of an exemplary mobile device 600 including an embodiment of a system for blocking MT SMS messages. The mobile device 600 is adapted to block MT SMS messages if a MT SMS feature setting 136 is disabled. The mobile device 600 includes a memory 602, an antenna 604, a baseband processor 606, a display 608, and a keypad 610. The baseband processor 606 receives user input from the keypad 610 and displays information to the user on the display 608. A user may interact with the mobile device 600 using voice commands or other forms of input. Information may be presented to the user using audio, tactile, or other forms of output. The antenna 604 transmits and receives radio signals to and from a base station 614 through the baseband processor 606.

The memory 602 is in communication with the baseband processor 606 and includes a mobile device protocol stack 100 and a blocked message counter 612. The protocol stack 100 in the memory 602 includes a SM-AL 102, SM-TL 106, SM-RL 110, and SM-RL 114. The layers and their interactions are defined by Technical Specifications 23.040 and 24.011 of the 3rd Generation Partnership Project (3GPP) standard. Each layer implements particular functions of the SMS protocol.

When the mobile device 600 is registering with the mobile network, the MT SMS feature setting 136 is checked to determine whether it is enabled or disabled. If the MT SMS feature setting 136 is enabled, the mobile device 600 may be registered as MT SMS capable with a service center 616. Conversely, if the MT SMS feature setting 136 is disabled, the mobile device 600 may be registered as MT SMS incapable with the service center 616. The MT SMS feature setting 136 is included in the Short Message-Transfer Layer (SM-TL) 106 to allow blocking MT SMS messages but still allow sending of outgoing mobile originated SMS messages. The service center 616 may be included in the base station 614 of the mobile network.

The MT SMS feature setting 136 may have been configured then received at the SM-TL 106. A user may manually configure the MT SMS feature setting 136 or the mobile device 600 may automatically configure the MT SMS feature setting 136 according to a predetermined schedule 618, for example. If the MT SMS feature setting 136 is disabled, then the SM Capability fields 210, 308, and/or 310 are set to 0 and the appropriate registration messages are sent to the base station 614. On the other hand, if the MT SMS feature setting 136 is enabled, it is determined whether the mobile device 600 has SMS capabilities. If the mobile device 600 has SMS capabilities, then the SM Capability fields 210, 308, and/or 310 are set to 1 and the appropriate registration messages are sent to the base station 614. Conversely, if the mobile device 600 does not have SMS capabilities, then the SM Capability fields 210, 308, and/or 310 are set to 0 and the appropriate registration messages are sent.

Regardless of the status of the MT SMS feature setting 136, the appropriate registration messages from messages 200 and 300 sent to the service center 616 depend on the connection status of the mobile device 600 to the mobile network. In the circuit switched domain, the SM Capability field 210 is set to 0 or 1 in the Mobile Station Classmark 2 information element 208 within the CM Re-Establishment Request message 202, the CM Service Request message 204, and/or the Location Update Request message 206. In the packet switched domain, the SM Capabilities via Dedicated Channels field 308 and the SM Capabilities via GPRS Channels field 310 are set to 0 or 1 in the MS Network Capability information element 306 within the Attach Request message 302 and/or the Routing Area Update Request message 304.

A service center 616 in the mobile network may still attempt to send a MT SMS message to the mobile device 600 even if the mobile device 600 has been previously registered as MT SMS incapable. The service center 616 may attempt to send a MT SMS message if the service center 616 is unaware that the mobile device 600 is supposed to be MT SMS incapable, if the service center software is malfunctioning, or for other reasons. In this case, the blocked message counter 612 may be incremented and a failure message may be transmitted to the service center 616.

If a MT SMS message is sent to the mobile device 600, the MT SMS feature setting 136 is checked to determine whether it is enabled or disabled. If the MT SMS feature setting 136 is enabled, meaning that MT SMS messages are not blocked, then the MT SMS message is received, processed, and acknowledged, as specified by the 3GPP standard.

However, if the MT SMS feature setting 136 is disabled, then the blocked message counter 612 is incremented. The blocked message counter 612 indicates the number of MT SMS messages that have been blocked. The blocked message counter 612 may be reset by a user or automatically reset by the mobile device 600 at predetermined times, for example. In addition to incrementing the blocked message counter 612, the mobile device 600 may also save timestamps, sender information, or other information related to the blocked MT SMS messages in the memory 602.

After the blocked message counter 612 has been incremented, a failure message may be sent to the service center 616 to indicate a specific failure cause. The TP-FCS (Transfer Protocol-Failure Cause) information element is set to a hexadecimal value 0xB0 within the SMS-DELIVER-REPORT TPDU to indicate that TPDU is not supported. The mobile device 600 sends a SM-RL-REPORT-REQ with an RP-ERROR message and the SMS-DELIVER-REPORT TPDU containing the 0xB0 TP-FCS information element to the service center 616. This request indicates that the MT SMS message was not successfully delivered and also informs the service center 616 of the specific failure cause, e.g., that MT SMS messages are being blocked by the mobile device 600.

Although the invention is described herein with reference to specific embodiments, various modifications and changes can be made without departing from the scope of the present invention as set forth in the claims below. For example, different embodiments of mobile terminated Short Message System blocking have been described above. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

As used herein, the phrases "coupled with," "coupled between," or like phrases, are defined to mean directly connected to or indirectly connected through one or more intermediate components. Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for blocking a mobile terminated (MT) Short Message System (SMS) message to a mobile device, comprising:
   determining whether a MT SMS feature setting of the mobile device is enabled or disabled;
   if the MT SMS feature setting is enabled, transmitting a mobile device registration message from the mobile device denoting the mobile device as MT SMS capable to a base station; and
   if the MT SMS feature setting is disabled, transmitting the mobile device registration message from the mobile device denoting the mobile device as MT SMS incapable to the base station.

2. The method of claim 1, where the MT SMS feature setting is enabled or disabled at an SMS layer of a protocol stack.

3. The method of claim 2, where the SMS layer comprises a Short Message-Transfer Layer.

4. The method of claim 1, where the MT SMS feature setting is set by a user of the mobile device.

5. The method of claim 1, further comprising configuring the MT SMS feature setting based on a predetermined schedule.

6. A method for blocking a mobile terminated (MT) Short Message System (SMS) message to a mobile device, comprising:
   determining whether a MT SMS feature setting of the mobile device is enabled or disabled;
   if the MT SMS feature setting is enabled, transmitting a mobile device registration message denoting the mobile device as MT SMS capable to a base station; and
   if the MT SMS feature setting is disabled, transmitting the mobile device registration message denoting the mobile device as MT SMS incapable to the base station, where transmitting the mobile device registration message denoting the mobile device as MT SMS incapable comprises:
   disabling a field within an information element of the mobile device registration message; and
   transmitting the mobile device registration message to the base station.

7. The method of claim 6, where:
   the field comprises one or more of Short Message (SM) Capability, SM Capabilities via Dedicated Channels, or SM Capabilities via General Packet Radio Service (GPRS) Channels; and
   the information element comprises one or more of Mobile Station Classmark 2 or Mobile Station (MS) Network Capability.

8. The method of claim 6, where the mobile device registration message comprises one or more of Connection Management (CM) Re-Establishment Request, CM Service Request, Location Update Request, Attach Request, or Routing Area Update Request.

9. A method for blocking a mobile terminated (MT) Short Message System (SMS) message to a mobile device, comprising:
   determining whether a MT SMS feature setting of the mobile device is enabled or disabled;
   if the MT SMS feature setting is enabled, transmitting a mobile device registration message denoting the mobile device as MT SMS capable to a base station;
   if the MT SMS feature setting is disabled, transmitting the mobile device registration message denoting the mobile device as MT SMS incapable to the base station;
   receiving a MT SMS message from the base station; and
   if the MT SMS feature setting is disabled:
   incrementing a blocked message counter; and
   transmitting a failure message to the base station.

10. The method of claim 9, where the failure message comprises a RP-ERROR message and transmitting the failure message comprises:
    setting a Transfer Protocol-Failure Cause information element in a SM-DELIVER-REPORT TPDU of the RP-ERROR message to denote that a transfer protocol data unit is not supported; and
    transmitting the RP-ERROR message in a SM-RL-REPORT-REQ.

11. A mobile device, comprising:
    an antenna; and
    circuitry adapted to:
    store a mobile terminated (MT) SMS feature setting;

if the MT SMS feature setting is enabled, transmit a mobile device registration message from the mobile device via the antenna denoting the mobile device as MT SMS capable to a base station; and if the MT SMS feature setting is disabled, transmit the mobile device registration message from the mobile device via the antenna denoting the mobile device as MT SMS incapable to the base station.

12. The mobile device of claim 11, further comprising:
a Short Message System (SMS) layer of a protocol stack of the mobile device, where the MT SMS feature setting is enabled or disabled at the SMS layer.

13. The mobile device of claim 12, where the SMS layer comprises a Short Message-Transfer Layer.

14. The mobile device of claim 11, where the circuitry is further adapted to:
if the MT SMS feature setting is disabled:
disable a field within an information element of a mobile device registration message; and
transmit the mobile device registration message to the base station.

15. The mobile device of claim 14, where:
the field comprises one or more of Short Message (SM) Capability, SM Capabilities via Dedicated Channels, or SM Capabilities via General Packet Radio Service (GPRS) Channels; and
the information element comprises one or more of Mobile Station Classmark 2 or Mobile Station (MS) Network Capability.

16. The mobile device of claim 14, where the mobile device registration message comprises one or more of Connection Management (CM) Re-Establishment Request, CM Service Request, Location Update Request, Attach Request, or Routing Area Update Request.

17. The mobile device of claim 11, where the circuitry is further adapted to:
receive a MT SMS message from the base station; and
if the MT SMS feature setting is disabled:
increment a blocked message counter; and
transmit a failure message to the base station.

18. A method of blocking an incoming text message to a mobile device, comprising:
storing an incoming text message feature setting;
determining whether the incoming text message feature setting is enabled or disabled;
if the incoming text message feature setting is enabled, transmitting a first registration message from the mobile device to a base station, where the first registration message signifies that the mobile device is capable of receiving the incoming text message; and
if the incoming text message feature setting is disabled, transmitting a second registration message from the mobile device to the base station, where the second registration message signifies that the mobile device is incapable of receiving the incoming text message.

19. The method of claim 18, where the incoming text message feature setting is enabled or disabled within a layer of a protocol stack within the mobile device.

20. The method of claim 19, where the layer comprises a Short Message-Transfer Layer.

21. The method of claim 18, where the incoming text message feature setting is set by a user of the mobile device.

22. The method of claim 18, further comprising configuring the incoming text message feature setting based on a predetermined schedule.

* * * * *